US012462490B2

(12) United States Patent
Nguyen et al.

(10) Patent No.: US 12,462,490 B2
(45) Date of Patent: *Nov. 4, 2025

(54) PRIVATE DATA-LESS CARD DEVICE ENABLED FOR AUGMENTED REALITY DISPLAY OF DATA

(71) Applicant: BANK OF AMERICA CORPORATION, Charlotte, NC (US)

(72) Inventors: Tai Tan Nguyen, Frisco, TX (US); Renuga Mohan, Tamil Nadu (IN); Preetimanda Pattanaik, Plano, TX (US); Anupama Rao, The Colony, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/977,361

(22) Filed: Oct. 31, 2022

(65) Prior Publication Data

US 2024/0144607 A1    May 2, 2024

(51) Int. Cl.
*G06Q 20/00*  (2012.01)
*G06K 19/06*  (2006.01)
*G06K 19/067* (2006.01)
*G06T 19/00*  (2011.01)

(52) U.S. Cl.
CPC ...... *G06T 19/006* (2013.01); *G06K 19/06037* (2013.01); *G06K 19/067* (2013.01)

(58) Field of Classification Search
CPC ............ G06T 19/006; G06K 19/06037; G06K 19/067

USPC .......... 705/16, 21, 59; 380/44, 262
See application file for complete search history.

(56) References Cited

U.S. PATENT DOCUMENTS

| | | |
|---|---|---|
| 9,477,852 B1 | 10/2016 | Neale et al. |
| 9,679,152 B1 | 6/2017 | Young et al. |
| 9,995,936 B1 | 6/2018 | Macannuco et al. |
| 10,360,628 B1 | 7/2019 | Carter, Jr. et al. |
| 10,909,526 B2 | 2/2021 | Sutter et al. |
| 11,062,098 B1 | 7/2021 | Bergeron et al. |
| 11,204,648 B2 | 12/2021 | Friedman et al. |
| 11,210,676 B2 | 12/2021 | Rule |
| 11,249,714 B2 | 2/2022 | Spivack et al. |
| 11,494,991 B2 | 11/2022 | Spivack et al. |
| 2008/0103627 A1* | 5/2008 | Torian ............. G06Q 20/3558 700/233 |
| 2009/0307132 A1* | 12/2009 | Phillips ............ G06Q 40/02 345/173 |
| 2011/0018903 A1 | 1/2011 | Lapstun et al. |

(Continued)

*Primary Examiner* — Dante Ravetti
(74) *Attorney, Agent, or Firm* — Moore & Van Allen PLLC; Anup Iyer

(57) ABSTRACT

A private data-less card device that enables augmented reality display of the private data on the card device. Characteristic of the private data-less card neither the front nor back facings of the card device have any private data used to initiate a resource event physically displayed thereon. The card device includes a wireless communication mechanism configured to wirelessly communicate at least one of card device-identifying data and user-identifying data to a mobile communication device to enable an augmented reality display of the private data superimposed over an image of the facing of the card device.

9 Claims, 9 Drawing Sheets

(56) References Cited

U.S. PATENT DOCUMENTS

| | | | |
|---|---|---|---|
| 2013/0166441 A1* | 6/2013 | Kobylkin | G06Q 20/348 |
| | | | 705/35 |
| 2016/0307001 A1 | 10/2016 | Dow et al. | |
| 2017/0206527 A1* | 7/2017 | Pareek | G07F 7/0813 |
| 2017/0255783 A1* | 9/2017 | Marshall | G06T 11/60 |
| 2020/0202313 A1 | 6/2020 | Zagone et al. | |
| 2021/0374225 A1 | 12/2021 | Benkreira et al. | |
| 2022/0414412 A1* | 12/2022 | Huhtasalo | H01Q 1/40 |

* cited by examiner

PRIVATE DATA-LESS CARD DEVICE ENABLED FOR AUGMENTED REALITY DISPLAY OF DATA

THE INVENTION

The present invention is related to card devices and, more specifically, a card device that does physically display any private data but instead is enabled for augmented reality display of private data.

BACKGROUND

Card devices typically have private data used to initiate a resource exchange event printed or embossed on a facing of a card. However, such a display of private data poses security issues when the card device is exposed to or otherwise comes into possession of someone other than the rightful possessor/owner of the card device. Once a wrongdoer has knowledge of the private data, the wrongdoer may be able to initiate unauthorized online resource exchange events and the like to the detriment of the rightful possessor/owner and/or the card controlling-entity.

Therefore, a need exists to develop card devices and the like that limit the exposure to private data that is typically displayed on a card device. In this regard, a need exists to card devices that provide the rightful possessor/owner visibility into the private data only in limited and highly secure instances without exposing the private data to any other individuals.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a private data-less card device that enables augmented reality display of the private data on the card device. In this regard, neither the front nor back facings of the card device have any private data used to initiate a resource event physically displayed thereon. The private data may include, but is not limited to, an account number, an expiration date, a Card Verification Value (CVV) code, and, in some embodiments, a username.

In addition, the card device includes a wireless communication mechanism configured to wirelessly communicate at least one of card device-identifying data and user-identifying data. The card device-identifying data and user-identifying data is subsequently received by a mobile communication device that is configured to verify that the user is the rightful possessor of the card based at least on the received data and, in response, launch an image capturing device, capture images of the front or back facing of the card and simultaneously present an augmented reality display on the facing that includes at least the private data. In other instances, the augmented reality display includes other data, such as activatable links configured to allow the user to access a virtual assistance system and/or a resource transfer processing system.

The wireless communication mechanism in the card device may be a unique user-specific image that is displayed on a facing of the card device. For example, the image may be a picture of the user/owner of the card or a photograph chosen by the user/owner and used as the background image for the card device. In such instances, the mobile communication device captures an image of the user-specific image and image recognition techniques are used to correlate the image to the user (i.e., rightful possessor/owner of the card device).

In other instances, the wireless communication mechanism in the card device is coded-indicia, such as a Quick Response (QR) code or the like. In such instances, the mobile communication device captures the coded-indicia which encodes card device-identifying data and/or user-identifying data.

In still further instances, the wireless communication mechanism in the card device is a short-range wireless device/tag, such as Near Field Communication (NFC) tag, or Radio Frequency identification (RFID) tag or the like. In such instances, the mobile communication device includes a corresponding short-range wireless reader that is configured to read the card device-identifying data and/or user-identifying data from the tag when the card device is proximate to the mobile communication device.

A device including a card having a front facing and a back facing. The front facing and the back facing do not display any private data used to initiate a resource transfer event. The card includes a wireless communication mechanism configured to wirelessly communicate, to a mobile communication device, at least one of card device-identifying data and user-identifying data.

In specific embodiments of the device, the wireless communication mechanism is a user-specific image displayed on at least one of the front facing and the back facing of the card device. The user-specific image is associated with the user-identifying data and is capturable by an image-capturing device within mobile communication device. In related embodiments of the device, the user-specific image is a background image displayed on at least one of the front facing and the back facing of the card device. In further related embodiments of the device, the user-specific image is selected by a user of the card.

In other specific embodiments of the device, the wireless communication mechanism is coded-indicia displayed on at least one of the front facing and the back facing of the card device. The coded-indicia is configured to encode the card device-identifying data and is capturable by an image-capturing device within mobile communication device. In such embodiments of the device, the coded-indicia may be a Quick Response (QR) code displayed on at least one of the front facing and back facing of the card device.

In other specific embodiments of the device, the wireless communication mechanism is a short-range wireless communication device embedded in the card device. The short-range wireless communication device is configured to communicate at least one of the card device-identifying data and the user-identifying data. In such embodiments of the device, the short-range wireless communication device is chosen from the group consisting of a Near Field Communication (NFC) device and a Radio-Frequency Identification (RFID) device.

In still further specific embodiments of the device, the wireless communication of at least one of card device-identifying data and user-identifying data to the mobile communication device is configured to allow for the mobile communication device to present an augmented reality display that includes private data used to initiate a resource transfer event superimposed on an image of the either the front facing or the back facing of the card. In such embodiments of the device, the wireless communication of at least one of card device-identifying data and user-identifying data to the mobile communication device is configured to allow for the mobile communication device to present the augmented reality display that further includes an activable link that is configured to, upon user activation, access a virtual assistant system and/or access a resource transfer processing system.

Moreover, in other specific embodiments of the device, the wireless communication of at least one of card device-identifying data and user-identifying data to the mobile communication device is configured to allow for the mobile communication device to present an augmented reality display that includes one or more activable links, each activable link configured to, upon user activation, perform an action associated with a misplaced card.

Thus, according to embodiments of the invention, which will be discussed in greater detail below, the present invention provides for a private data-less card device that enables augmented reality display of the private data on the card device. In this regard, neither the front nor back facings of the card device have any private data used to initiate a resource event physically displayed thereon. The card device includes a wireless communication mechanism configured to wirelessly communicate at least one of card device-identifying data and user-identifying data to a mobile communication device to enable an augmented reality display of the private data superimposed over an image of the facing of the card device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
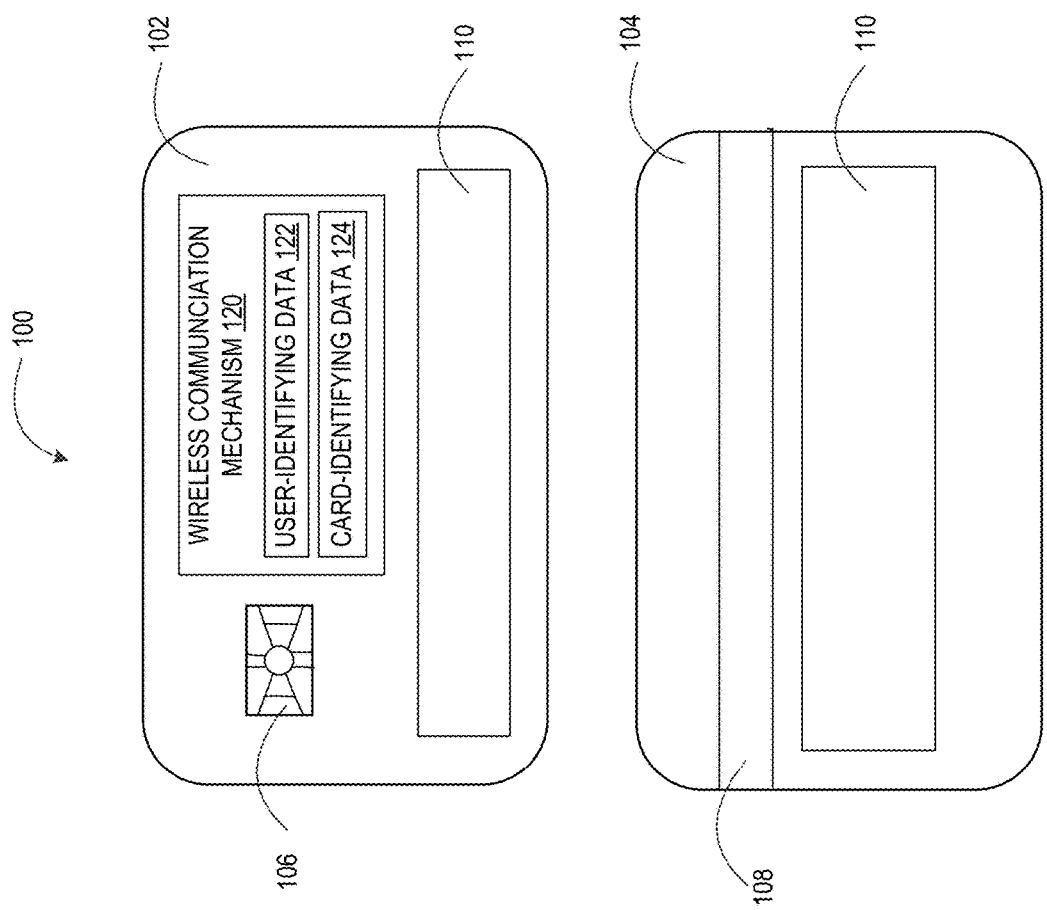
Figure 2A:
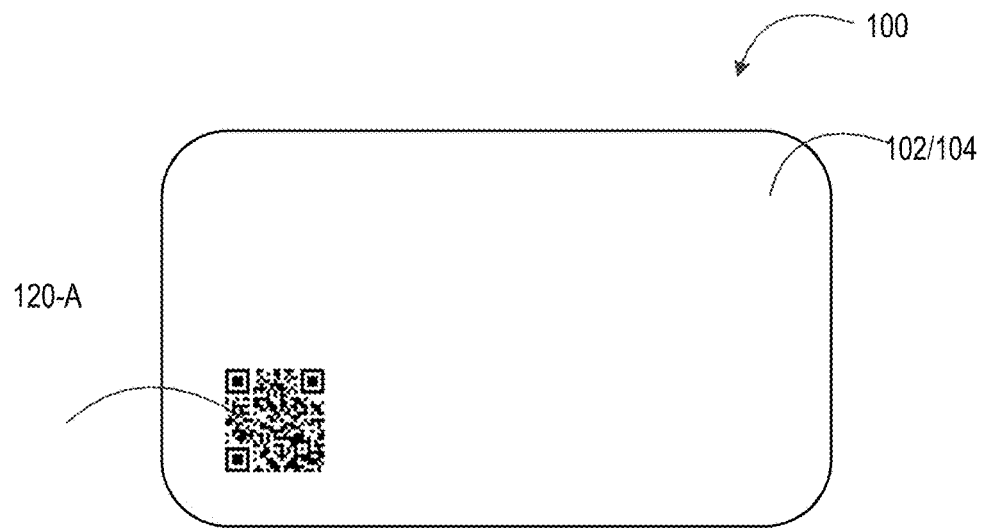
Figure 2B:
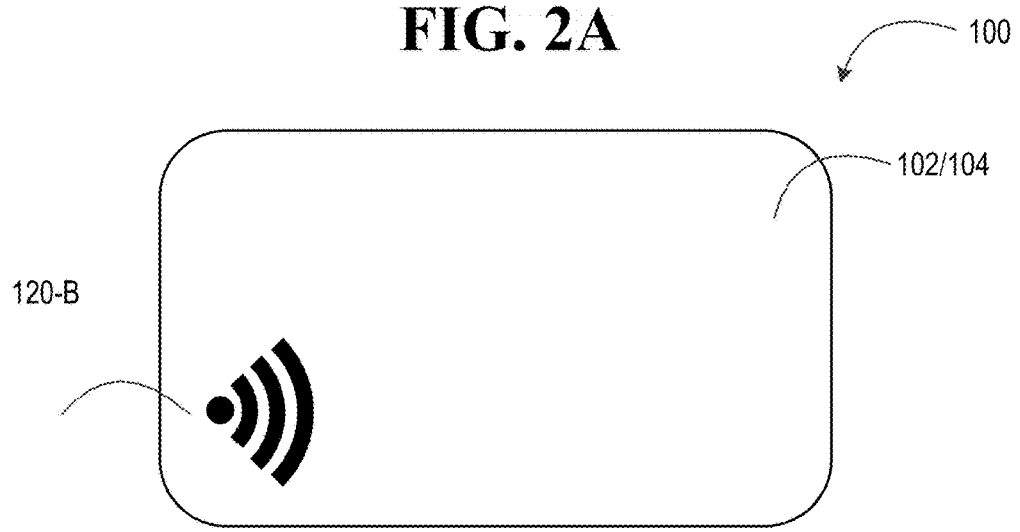
Figure 2C:
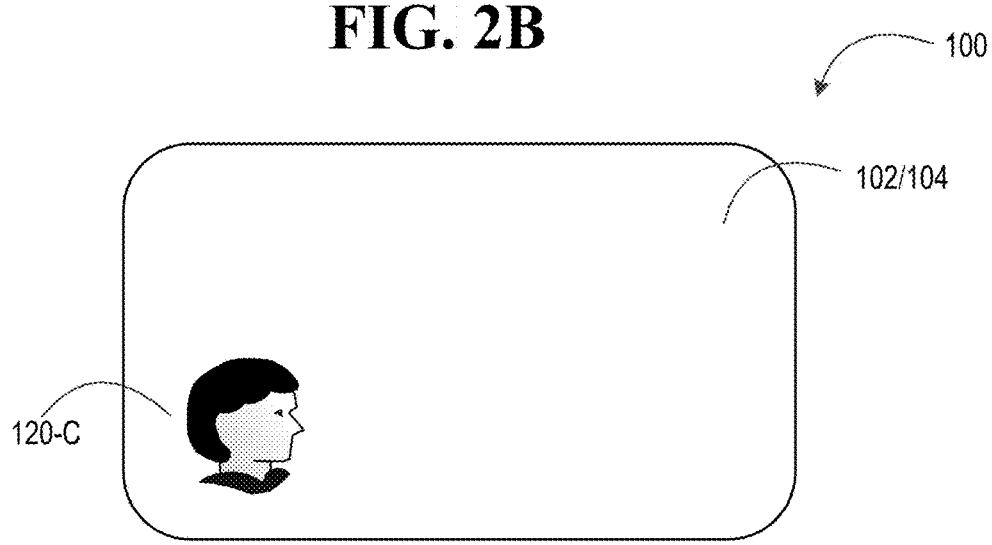
Figure 3:
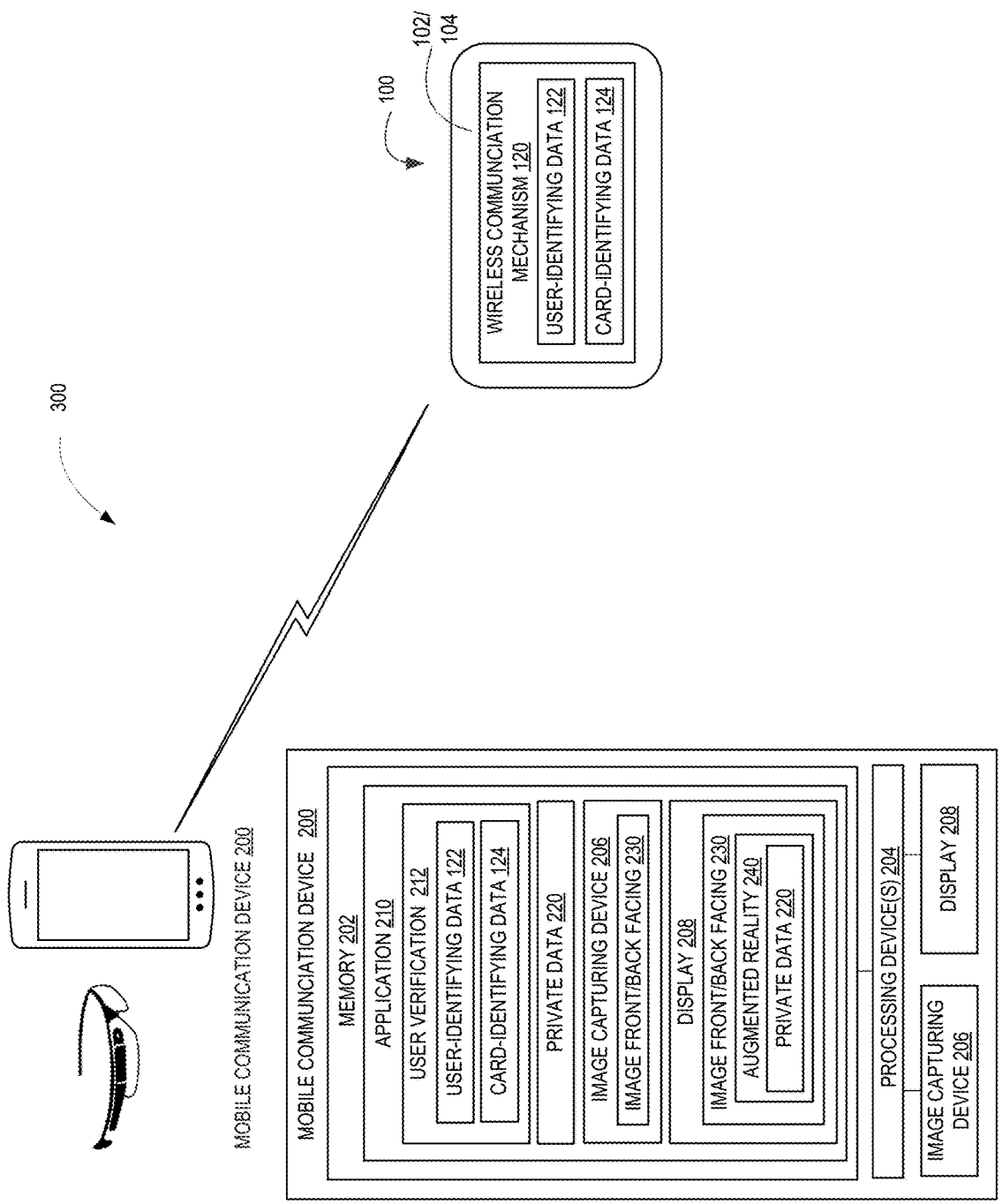
Figure 4:
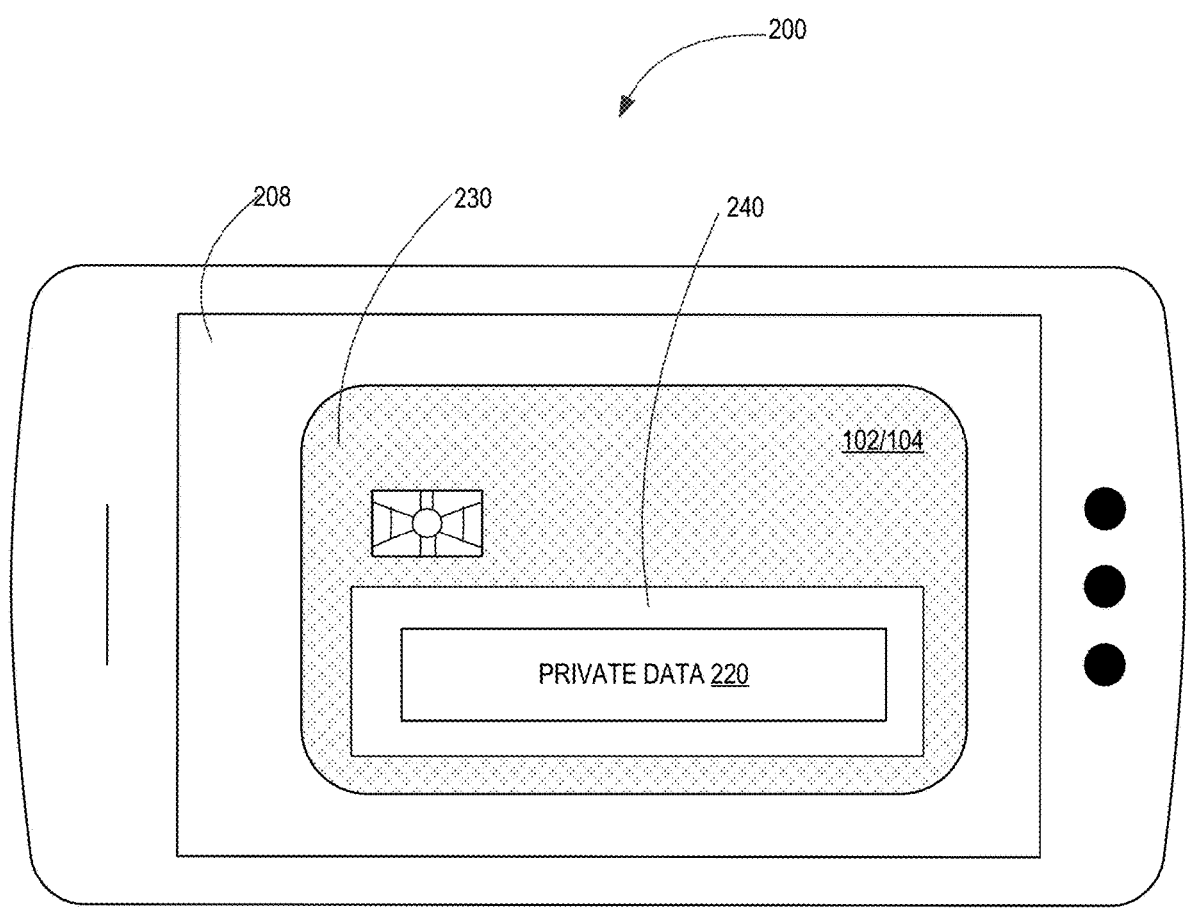
Figure 5:
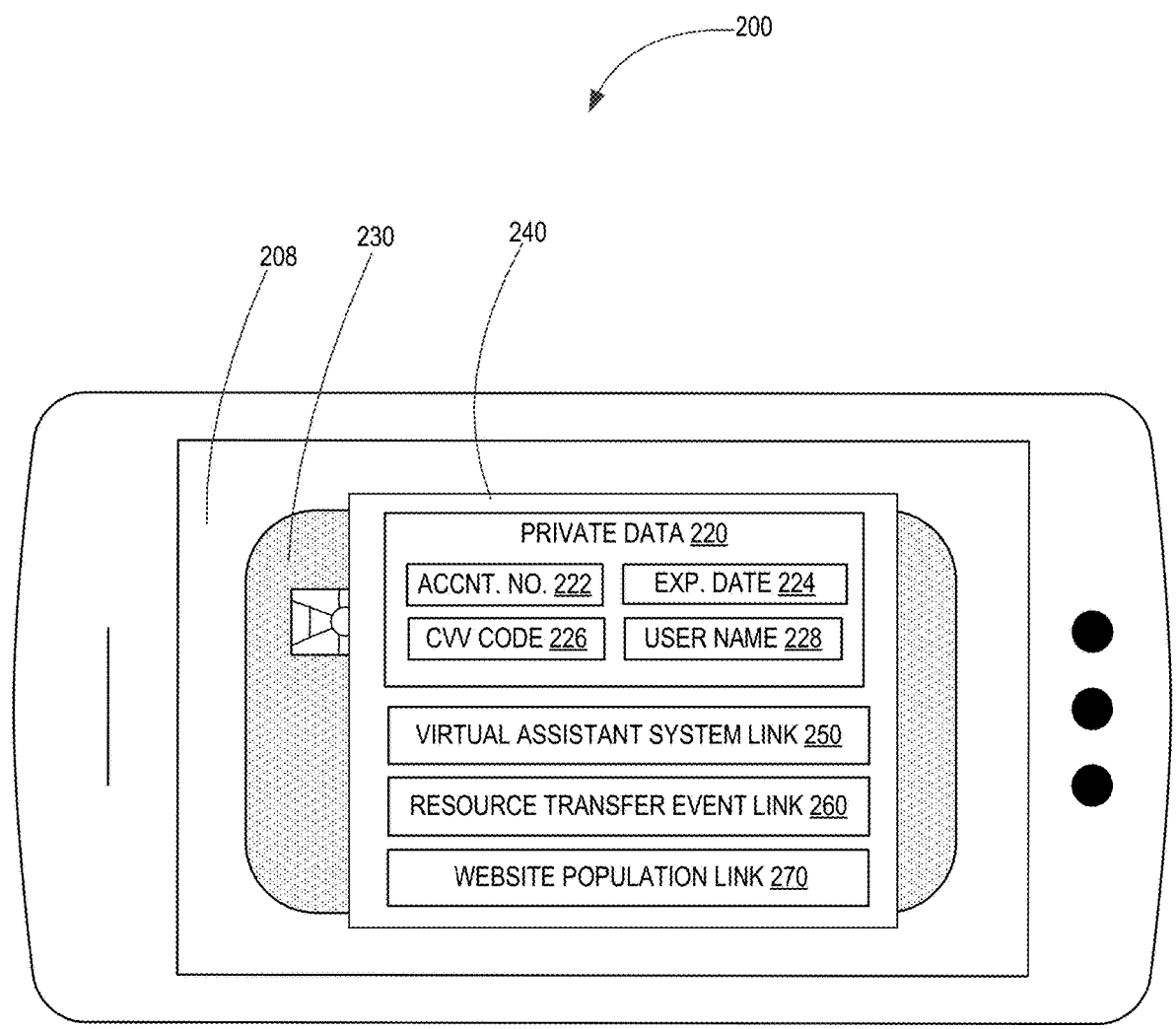
Figure 6:
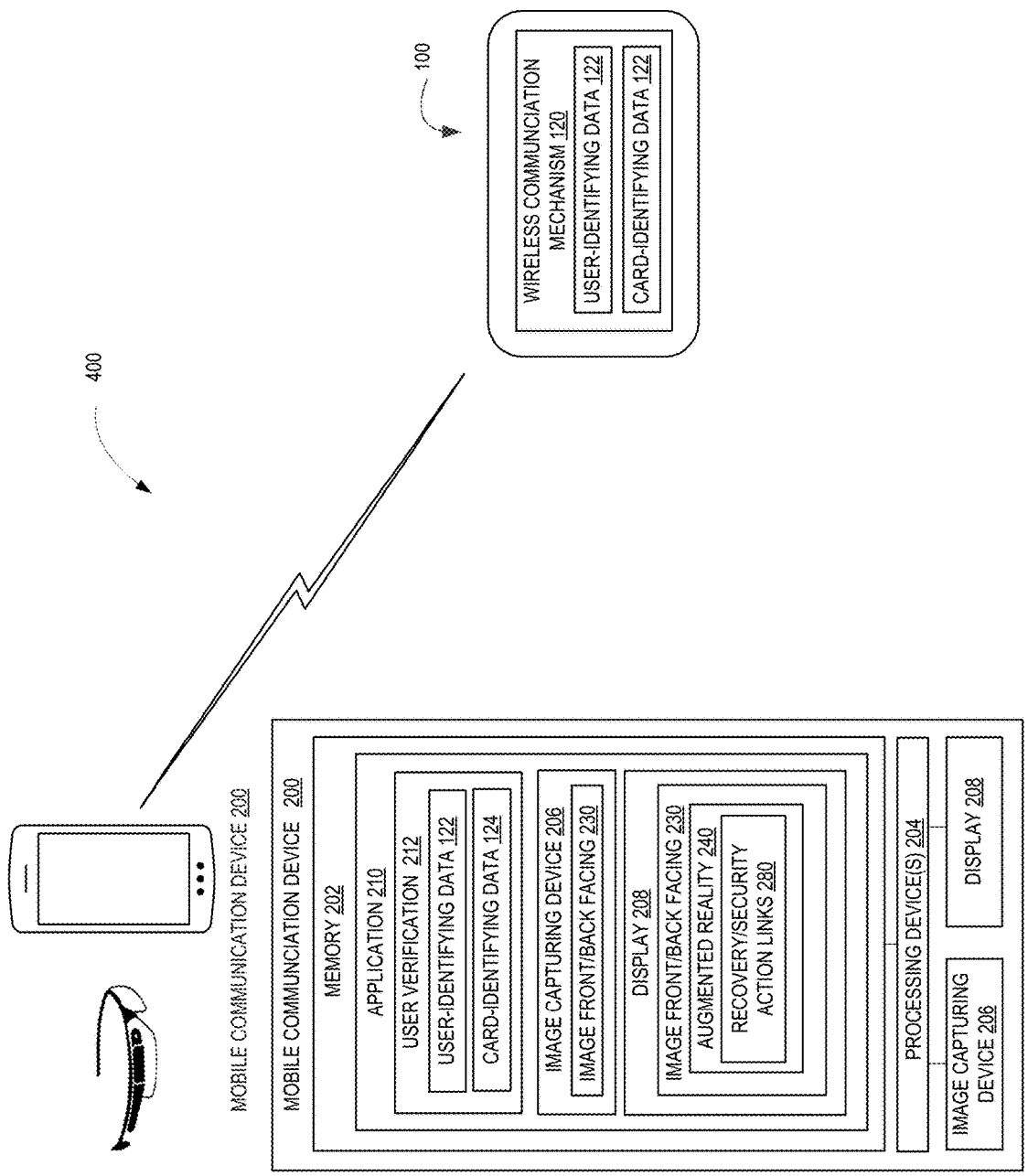
Figure 7:
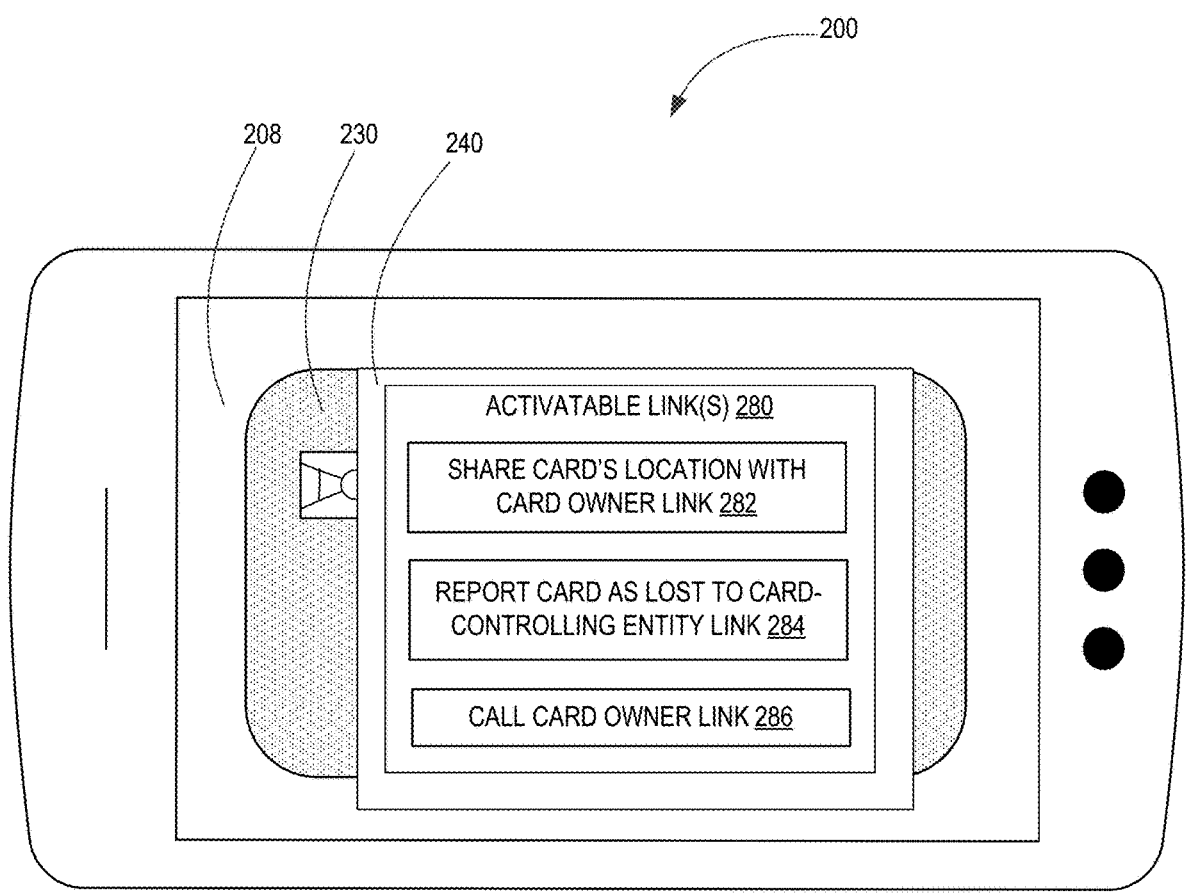
Figure 8:
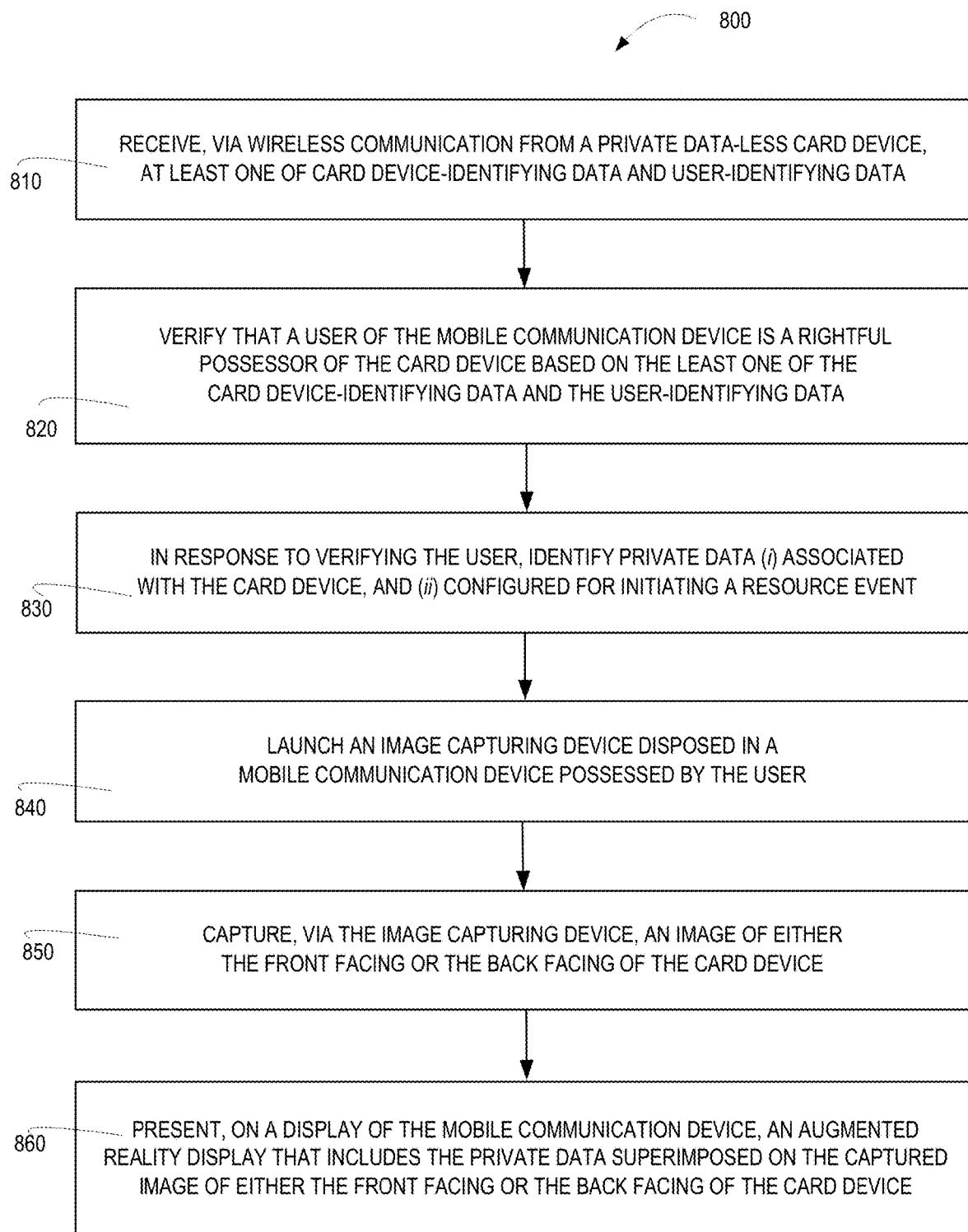
Figure 9:
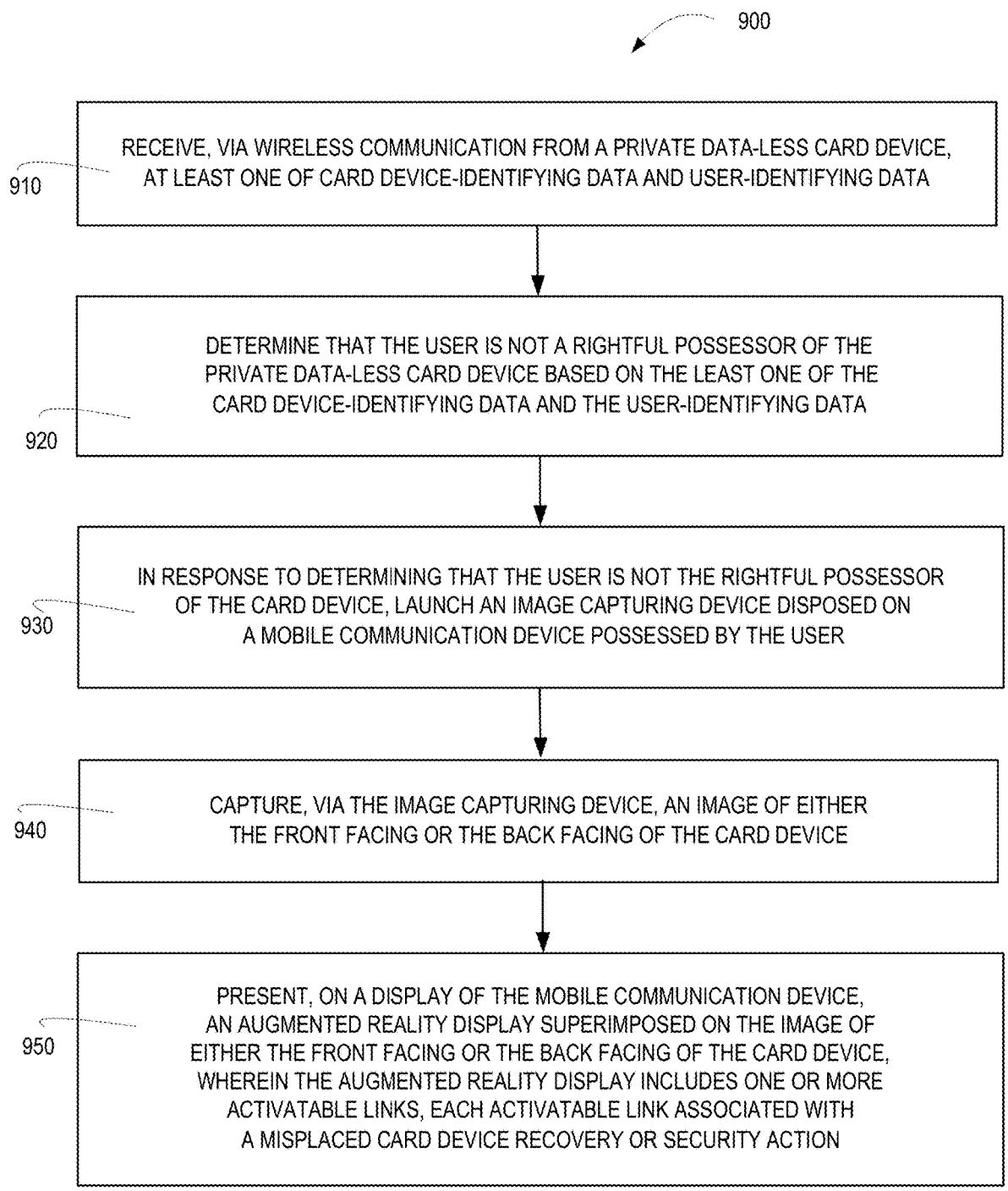

Having thus described embodiments of the disclosure in general terms, reference will now be made to the accompanying drawings, wherein:

FIG. 1 is a schematic of a private data-less card device, in accordance with embodiments of the present invention;

FIGS. 2A-2C are schematic diagrams of different wireless communication mechanism included within a private data-less card device, in accordance with embodiments of the present invention;

FIG. 3 is schematic/block diagram of a system for providing for data card security via a private data-less card device that is enabled for augmented reality display of the private data on a mobile communication device, in accordance with embodiments of the present invention;

FIG. 4 is a schematic diagram of a mobile communication device presenting on the display an augmented reality display of private data superimposed on an image of a private data-less card device, in accordance with embodiments of the present;

FIG. 5 is a schematic diagram of a mobile communication device presenting on the display an augmented reality display of private data and other activatable links, in accordance with embodiments of the present;

FIG. 6 is schematic/block diagram of a system for providing for misplaced data card recovery and security via a private data-less card device that is enabled for augmented reality display of the recovery and security action links on a mobile communication device, in accordance with embodiments of the present invention;

FIG. 7 is a schematic diagram of a mobile communication device presenting on the display an augmented reality display of recovery and security action activatable links, in accordance with embodiments of the present;

FIG. 8 is a flow diagram of a method for card device security, in accordance with embodiments of the present invention; and FIG. 9 is a flow diagram of a method for providing for misplaced data card recovery and security actions, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of device, methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, devices are disclosed for a private data-less card device that enables augmented reality display of the private data on the card device. In this regard, neither the front nor back facings of the card device have any private data used to initiate a resource event physically displayed thereon. The private data may include, but is not limited to, an account number, an expiration date, a Card Verification Value (CVV) code, and, in some embodiments, a username.

In addition, the card device includes a wireless communication mechanism configured to wirelessly communicate at least one of card device-identifying data and user-identifying data. The card device-identifying data and user-identifying data is subsequently received by a mobile communication device that is configured to verify that the user is the rightful possessor of the card based at least on the received data and, in response, launch an image capturing device, capture images of the front or back facing of the card and simultaneously present an augmented reality display on the facing that includes at least the private data. In other instances, the augmented reality display includes other data, such as activatable links configured to allow the user to access a virtual assistance system and/or a resource transfer processing system.

The wireless communication mechanism in the card device may be a unique user-specific image that is displayed on a facing of the card device. For example, the image may be a picture of the user/owner of the card or a photograph chosen by the user/owner and used as the background image for the card device. In such instances, the mobile communication device captures an image of the user-specific image and image recognition techniques are used to correlate the image to the user (i.e., rightful possessor/owner of the card device).

In other instances, the wireless communication mechanism in the card device is coded-indicia, such as a Quick Response (QR) code or the like. In such instances, the mobile communication device captures the coded-indicia which encodes card device-identifying data and/or user-identifying data.

In still further instances, the wireless communication mechanism in the card device is a short-range wireless device/tag, such as Near Field Communication (NFC) tag, or Radio Frequency identification (RFID) tag or the like. In such instances, the mobile communication device includes a corresponding short-range wireless reader that is configured to read the card device-identifying data and/or user-identifying data from the tag when the card device is proximate to the mobile communication device.

Referring to FIG. 1, a schematic diagram is presented of a card device 100, in accordance with embodiments of the present invention. The card device 100 includes a front facing 102 and a back facing 104. As shown in FIG. 1, but not required in embodiments of the present invention, front facing 102 may include a smart chip/processor 106 and back facing 104 may include a magnetic strip 108 both of which may be used individually to initiate a resource transfer event. In accordance with all embodiments of the present invention, the front facing 102 and the back facing 104 of the card device 100 do not physically display any private data used to initiate a resource transfer event. For example, areas 110, in which conventional card devices would have printed or embossed private data, is devoid of any such private data. Private data used to initiate a resource transfer event includes, but is not necessarily limited to, an account number, an expiration date, a card verification value (CVV) code and the like. By not having private data displayed on the card device, the present invention prevents unauthorized resource transfer events by someone other than the rightful possessor/owner of the card device gaining possession of the card device and using the private data to initiate resource transfer events.

Further, card device 100 includes at least one wireless communication mechanism 120 that is configured to wirelessly communicate card-identifying data 122 and/or user-identifying data 124 to a mobile communication device. As discussed infra, in relation to FIG. 3, the mobile communication device stores an application that is configured to, in response to receiving the card-identifying data 122 and/or user-identifying data 124 and verifying the user as the card owner, present an augmented reality display of the private data superimposed on an image of either the front facing 102 and/or back facing 104. It should be noted that for security purposes, the wireless communication mechanism 120 does not communicate the private data, but rather communicates data (i.e., card-identifying data 122 and/or user-identifying data 124) that allows the application on the mobile communication to device to identify the private data. Additionally, as discussed infra, in relation to FIG. 6, the same application is also configured to, in response to receiving the card-identifying data 122 and/or user-identifying data 124 and determining that the user is not the card owner, present an augmented reality display of card recovery and/or security actions superimposed on an image of either the front facing 102 and/or back facing 104.

Referring to FIGS. 2A-2C, schematic diagrams are depicted of card devices 100 having various different wireless communication mechanisms 120, in accordance with embodiments of the present invention. FIG. 2A depicts a card device 100 in which the wireless communication mechanism 120 is coded-indicia 120-A printed on at least one of the front facing 102 and/or back facing of the card device. In specific embodiments of the invention, coded-indicia 120-A is a Quick Response (QR) code that encodes at least one of the card-identifying data 122 and/or user-identifying data 124 and, when captured by an image-capturing device on the mobile communication device, activates the application that is configured to present a display of data in augmented reality form.

FIG. 2B depicts a card device 100 in which the wireless communication mechanism 120 is a short-range wireless device 122-B embedded in the card device 100. The short-range wireless device 122-B may be included within the smart chip/processor 106 shown in FIG. 1 or, in other embodiments may be separate unit. In specific examples, short range wireless device 122-B may a Near Field Communication (NFC) device or a Radio Frequency Identification (RFID) device. In such embodiments of the invention, in which the short range wireless device 122-B is an NFC device, tapping the card device 100 in a specific manner proximate the mobile communication device may trigger (i) communication of the card-identifying data 122 and/or user-identifying data 124 from the card device 100 to the mobile communication device and (ii) activation of the application that is configured to present a display of data in augmented reality form.

FIG. 2C depicts a card device 100 in which the wireless communication mechanism 120 is a user-specific image 122-C displayed on at least one of the front facing 102 and/or back facing of the card device. The user-specific image 122-C is a unique image that may be chosen by the user or, in other instances assigned by the card-issuing entity. For example, user-specific image 122-C may be a facial image of the user or a photograph captured by the user. The user-specific image may be displayed in a designated area of the front facing 102 and/or back facing 104 or may be displayed as a background image encompassing the entirety of the front facing 102 and/or back facing 104. In such embodiments of the invention, the application is configured to present a display of data in augmented reality form or some other application on the mobile communication device possesses image-recognition techniques that are configured to recognize and associate the user-specific image 122-C with the rightful possessor/owner of the card device 100.

Referring to FIG. 3, a schematic/block diagram is presented of a system 300 for providing security in card device, in accordance with embodiments of the present invention. The system includes card device 100, which, as discussed in relation to FIG. 1, does not physically display any private data used to initiate a resource transfer event on either the front facing 102 or the back facing 104 of the card device 100. As previously discussed, in relation to FIGS. 1 and 2, card device 100 includes a wireless communication mechanism 120 that is configured to wirelessly communicate, at least one of card-identifying data 122 and/or user-identifying data 124.

System 300 additionally includes mobile communication device 200, which may comprise a smart phone, smart glasses or any other mobile device having the capability to display data in augmented reality form. Mobile communication device 200 includes a memory 202 and at least one processing device 202 in communication with the memory 202. Memory 202 may comprise volatile and non-volatile memory, such as read-only and/or random-access memory (RAM and ROM), EPROM, EEPROM, flash cards, or any memory common to computing platforms. Moreover, memory 202 may comprise cloud storage, such as provided by a cloud storage service and/or a cloud connection service. Processing devices 204 may be an application-specific integrated circuit ("ASIC"), or other chipset, logic circuit, or other data processing device. Processing device(s) 204 may execute one or more application programming interface (APIs) 206 that interface with any resident programs, such as application 210 or the like, stored in memory 202 of mobile communication device 200 and any external programs. Processing devices(s) 204 may include various processing subsystems (not shown in FIG. 3) embodied in hardware, firmware, software, and combinations thereof, that enable the functionality of mobile communication device 200 and the operability of mobile communication device 200 on a network, such as the Intranet, cellular network(s) and the like. For example, processing subsystems allow for initiating and maintaining communications and exchanging data with other networked devices. For the disclosed aspects, processing subsystems of first computing platform 200 may include any subsystem used in conjunction with application 210 and related tools, routines, sub-routines, algorithms, sub-algorithms, sub-modules thereof.

Further, mobile communication device 200 includes an image-capturing device 206, configured to capture images and/or video and a display 208 for presenting the captured images/video, both of which are in communication with the processing device(s) 204.

Memory 202 of mobile communication device 200 stores application 210 that is configured to receive, via wireless communication, at least one the card-identifying data 122 and/or user-identifying data 124 and perform user verification 212 based at least on the card-identifying data 122 and/or user-identifying data 124. User verification 212 verifies that the user of the mobile communication device 200 is the rightful possessor/owner of the card device 100. In this regard, the user will have been or is required to perform a user authentication at the mobile communication device 200, e.g., submit characteristic data, such as facial image, fingerprints or the like and/or other credentials, such as username, passcode or the like.

In response to verifying the user as the rightful possessor/owner of the card device 100, application 210 is configured to identify private data 220 that is associated with the card device 100 and is configured to initiate a resource transfer event. For example, the private data 220 may include an account number, an expiration date, a CVV code and, in some embodiments, a name of the card holder/owner. It should be noted that in other embodiments of the invention, the name of the card holder/owner is not considered private data used to initiate a resource transfer event and, as such, may be physically displayed/printed on the card device 100. The private data 220 is identified by correlating either the card-identifying data 122 and/or user-identifying data 124 to the private data 220.

Further, the application is configured to launch the image-capturing device 204 and, in response to capturing an image 230 of either the front facing 102 or back facing 104 of the card device 100, present, on the display 208, an augmented reality 240 display that includes at least the private data 220 superimposed on the captured image 230 of either the front facing 102 or back facing 104 of the card device 100. Thus, as the mobile communication device 200 or card device 100 physically moves while capturing the image 230 of the card device 100, the private data 220 superimposed on the captured image 230 in the display 208 moves so as to appear to be physically displayed/printed on a facing of the card device 100.

Referring to FIG. 4, a schematic diagram is presented of a mobile communication device 100 displaying private data 230 in augmented reality form, in accordance with embodiments of the present invention. In the illustrated example of FIG. 4, mobile communication device 200 is a smart telephone. The image-capturing device 206 (shown in FIG. 3) is capturing images 230 of the front facing 102 of the card device 100, which are displayed on the display 208 of the mobile communication device 200. The images 230 of the front facing include augmented reality 240 data that is superimposed on the captured images 230. In accordance with embodiments of the present invention, since the user of the mobile communication device 200 has been verified as the owner of the card device 100, the augmented reality 240 data that is presented is the private data 220. In accordance with specific embodiments of the invention, the private data 220 is presented proximate in location to the areas 110 (shown in FIG. 1) on the front facing 102 or back facing 104 where conventional card devices would have printed or embossed private data.

Referring to FIG. 5, a schematic diagram is presented of a mobile communication device 100 displaying private data 230, as well as additional activatable links in augmented reality form, in accordance with embodiments of the present invention. Similar to FIG. 4, in the illustrated example of FIG. 4, mobile communication device 200 is a smart telephone. The image-capturing device 206 (shown in FIG. 3) is capturing images 230 of the front facing 102 of the card device 100, which are displayed on the display 208 of the mobile communication device 200. The images 230 of the front facing 102 include augmented reality 240 data that is superimposed on the captured images 230. In accordance with embodiments of the present invention, since the user of the mobile communication device 200 has been verified as the owner of the card device 100, the augmented reality 240 data that is presented includes the private data 220. As previously discussed, the private data 220 may include, but is not limited to, an account number 222, an expiration date 224, a CVV code 226 and a username 228.

Additionally, the augmented reality 240 data may include one or more activatable hyperlinks, which are accessible to the user for performing related actions. As shown in FIG. 5, the activatable links may include, but are not limited to, a virtual assistant system link 250 that is configured to, upon user activation, access a virtual assistant and communicate therewith via voice commands or text commands. Once activated by the user, the mobile communication device 200 displays a running dialog of the communication between the user and the virtual assistant. Examples of commands that a user may provide to the virtual assistant include, but are not limited to, card device disablement (i.e., either temporary or permanent), travel notifications, which inform the card-issuing entity of location and/or time period for impending travel and the like.

Additionally, the activatable links may include a resource transfer event link 260 that is configured to, upon user activation, access a resource transfer event system to allow the user to initiate a resource transfer event for at least a portion of the outstanding balance associated with the resource account tied to the card device 100. In specific embodiments of the invention, the resource transfer event link 260 is displayed along with a current outstanding balance on the resource account associated with the card device 100 and a date due for a resource exchange event for the resource account. Once the resource transfer event system is accessed by the user, the user may be allowed to perform other resource exchange events or conduct other resource related functions.

In further embodiments of the invention, the activatable links may include a web site population link 270, which is configured, upon user activation, to populate a webpage currently accessed on the web browser of the mobile communication device with at least a portion of the private data 220. In this regard, since the private data is not physically displayed on the card device, a user can automatically populate a webpage (e.g., an online merchant's check out page or the like) with the private data 220 without being required to transcribe and manually enter the private data 230.

Referring to FIG. 3, a schematic/block diagram is presented of a system 400 for providing recovery and/or security actions in response to user other than the card owner possessing a misplaced card device, in accordance with embodiments of the present invention. The system includes card device 100, which, as discussed earlier, does not physically display any private data used to initiate a resource transfer event on either the front facing 102 or the back facing 104 of the card device 100. As previously discussed, in relation to FIGS. 1 and 2, card device 100 includes a wireless communication mechanism 120 that is configured to wirelessly communicate, at least one of card-identifying data 122 and/or user-identifying data 124.

System 300 additionally includes mobile communication device 200, which may comprise a smart phone, smart glasses or any other mobile device having the capability to display data in augmented reality form. Mobile communication device 200 includes a memory 202 and at least one processing device 202 in communication with the memory 202. The details of the memory and the processing device(s) are the same as those discussed in relation to the system 300 of FIG. 3. Further, mobile communication device 200 includes an image-capturing device 206, configured to capture images and/or video and a display 208 for presenting the captured images/video, both of which are in communication with the processing device(s) 204.

Memory 202 of mobile communication device 200 stores application 210, which may be the same application shown and described in relation to FIG. 3 (i.e., providing the additional feature of recovery and security actions for misplaced card devices) or a standalone application limited to providing the feature of recovery and security actions for misplaced card devices. Application 210-1 is configured to receive, via wireless communication, at least one the card-identifying data 122 and/or user-identifying data 124 and perform user verification 212 based at least on the card-identifying data 122 and/or user-identifying data 124.

In response to failing to verify that the user of the mobile communication device is the rightful possessor/owner of the card device 100 (i.e., the user of the mobile communication is someone who has found a card device misplaced by the rightful possessor/owner of the card), application 210-1 is configured to launch the image-capturing device 204 and, in response to capturing an image 230 of either the front facing 102 or back facing 104 of the card device 100, present, on the display 208, an augmented reality 240 display that includes activatable links 280 associated with card recovery and/or security actions superimposed on the captured image 230 of either the front facing 102 or back facing 104 of the card device 100. In this regard, the finder of the misplaced card device can activate the links to perform actions that will assist the rightful possessor/owner of the card device 100 in recovering the card device 100 or limit the likelihood of the card device being used for unauthorized resource transfer events.

Referring to FIG. 7, a schematic diagram is presented of a mobile communication device 100 displaying activatable links 280 associated with card recovery and/or security actions in augmented reality form, in accordance with embodiments of the present invention. Similar to FIGS. 4 and 5, in the illustrated example of FIG. 7, mobile communication device 200 is a smart telephone. The image-capturing device 206 (shown in FIG. 6) is capturing images 230 of the front facing 102 of the card device 100, which are displayed on the display 208 of the mobile communication device 200. The images 230 of the front facing 102 include augmented reality 240 data that is superimposed on the captured images 230. In accordance with embodiments of the present invention, since the user of the mobile communication device 200 has been determined to not be the rightful possessor/owner of the card device 100, the augmented reality 240 data that is presented includes activable links 280 associated with card recovery and/or security actions.

The activatable hyperlinks 280, which are accessible to the user for performing related actions may include, but are not limited to, a location sharing link 282 that is configured to, upon user activation, generate and initiate a communication of an alert or text/SMS message to the rightful possessor/owner of the card device 100 that notifies the owner that their card device has been found and the current location of the card device 100. In this regard, application 210 relies on a location determining mechanism within the mobile device, such as Global Positioning System (GPS) device or the like to determine the current geo-location of the mobile communication device. Since the card device is currently co-located with the mobile communication device, the location of the mobile communication device is the same as the location of the card device. The alert or text/SMS message may include a map that provides the location of the card device and current location of the rightful possessor/owner of the card device so that the rightful possessor/owner of the card device can readily navigate to the location of the card device.

Additionally, the activatable links 280 may include a lost card reporting link 284 that is configured to, upon user activation, report the card device is being lost to a card-issuing/controlling entity, which can then take appropriate actions such as temporarily or permanently disabling the card device. In other embodiments of the invention, the activable link 280 may include a call card owner link 286 configured to initiate a telephone call to the rightful possessor/owner of the card device. In such embodiments of the invention, the call may be made without the user of the mobile device knowing or the mobile device displaying the telephone number of the rightful possessor/owner of the card device and/or without the mobile communication device of the rightful possessor/owner of the card device displaying the phone number of the user/finding of the card device. In lieu of displaying a calling party number, the mobile communication device may display a card found notification or the like.

Referring to FIG. 8, a flow diagram is presented of a method 800 for providing card device security, in accordance with embodiments of the present invention. At Event 810, user-identifying data and/or card-identifying data is received at a mobile communication device via wireless communication from a private data-less card device (i.e., a card that does not have any private data used for initiating a resource transfer event printed, embossed or otherwise actually displayed on a facing of the card). As previously discussed, the user-identifying data and/or card-identifying data may be received by capturing an image of coded-indicia, such as a QR code, or a user-specific/unique image or via short-range wireless communication, such as NFC, RFID or the like.

At Event 820, the user of the mobile communication is verified as the rightful possessor/owner of the card device based at least on user-identifying data and/or card-identifying data. In this regard, the user of the mobile communication has previously been authenticated or is authenticated and is compared to the user-identifying data or the card-identifying data (which is capable of identifying the rightful possessor/owner of the card device).

In response to verifying the user of the mobile communication device as the rightful possessor/owner of the card device, at Event 830, private data associated with the card device and configured for initiating a resource transfer event is identified. Identification of the private data is based on a correlation/linkage between the private data and the user-identifying data and/or the card-identifying data.

At Event 840, an image-capturing device on the mobile communication device is launched and, at Event 850, image(s) of either the front facing or the back facing of the card device are captured by the image-capturing device.

At Event 860, an augmented reality display is presented on a display of the mobile communication device that includes at least the private data superimposed on the captured image(s) of the front facing or back facing of the card device. In alternate embodiments other data may be presented in the augmented reality display, including links to a virtual assistant system and/or resource transfer event processing system or the like.

Referring to FIG. 9, a flow diagram is presented of a method 600 for providing card recovery and security actions for a misplaced card device, in accordance with embodiments of the present invention. At Event 910, user-identifying data and/or card-identifying data is received at a mobile communication device via wireless communication from a private data-less card device (i.e., a card that does not have any private data used for initiating a resource transfer event printed, embossed or otherwise actually displayed on a facing of the card). As previously discussed, the user-identifying data and/or card-identifying data may be received by capturing an image of coded-indicia, such as a QR code, or a user-specific/unique image or via short-range wireless communication, such as NFC, RFID or the like.

At Event 920, a determination is made that the user of the mobile communication is not the rightful possessor/owner of the card device based at least on user-identifying data and/or card-identifying data. In this regard, the user of the mobile communication has previously been authenticated or is authenticated and is determined to not match the to the user-identifying data (i.e., rightful possessor/owner of the card device data) or the card-identifying data (which is capable of identifying the rightful possessor/owner of the card device).

In response to determining that the user of the mobile communication device is not the rightful possessor/owner of the card device, at Event 930, an image-capturing device on the mobile communication device is launched and, at Event 940, image(s) of either the front facing or the back facing of the card device are captured by the image-capturing device.

At Event 950, an augmented reality display is presented on a display of the mobile communication device that includes one or more activated links associated with recovery actions or security actions superimposed on the captured image(s) of the front facing or back facing of the card device. As previously discussed, the recovery actions may be sharing the location of the card device with the rightful possessor/owner of the card device or calling the rightful possessor/owner and the security actions may be disabling the card or contacting the card-issuing entity.

Thus, present embodiments of the invention provide for a private data-less card device that enables augmented reality display of the private data on the card device. In this regard, neither the front nor back facings of the card device have any private data used to initiate a resource event physically displayed thereon. The card device includes a wireless communication mechanism configured to wirelessly communicate at least one of card device-identifying data and user-identifying data to a mobile communication device to enable an augmented reality display of the private data superimposed over an image of the facing of the card device.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system, the system comprising:
   a mobile communication device having a memory, one or more computing processor devices in communication with the memory and an image-capturing devices in communication with at least one of the one or more computing processor devices; and
   a card device having a front facing and a back facing, wherein the front facing and the back facing do not display any private data used to initiate a resource transfer event, wherein the card includes at least one wireless communication mechanism configured to wirelessly communicate, to the mobile communication device, at least one of card device-identifying data and user-identifying data, wherein a first wireless communication mechanism from amongst the at least one wireless communication mechanism is a user-specific image displayed on at least one of the front facing and the back facing of the card device, wherein the user-specific image is user selected,
   wherein the memory of the mobile communication devices stores instructions executable by at least one of the one or more computing processor devices that are configured to implement the image capturing device to (i) capture the user-specific image and execute image recognition techniques to identify a rightful user of the card device and (ii) present an augmented reality display that includes private data used to initiate a resource transfer event superimposed on an image of either the front facing or the back facing of the card.

2. The system of claim 1, wherein the user-specific image is a background image displayed on at least one of the front facing and the back facing of the card device.

3. The system of claim 1, wherein a second wireless communication mechanism from amongst the at least one wireless communication mechanism is coded-indicia displayed on at least one of the front facing and the back facing of the card device, wherein the coded-indicia is configured to encode the card device-identifying data and is capturable by an image-capturing device within a mobile communication device.

4. The system of claim 3, wherein the coded-indicia is a Quick Response (QR) code displayed on at least one of the front facing and back facing of the card device.

5. The system of claim 1, wherein a second wireless communication mechanism from amongst the at least one wireless communication mechanism is a short-range wireless communication device embedded in the card device, wherein the short-range wireless communication device is configured to communicate the card device-identifying data.

6. The system of claim 5, wherein the short-range wireless communication device is chosen from the group consisting of a Near Field Communication (NFC) device and a Radio-Frequency Identification (RFID) device.

7. The system of claim 1, wherein the instructions are further present an augmented reality display that further includes an activable link that is configured to, upon user activation, access a virtual assistant system.

8. The system of claim 1, wherein the instructions are further present the augmented reality display that further includes an activable link that is configured to, upon user activation, access a resource transfer processing system.

9. The system of claim 1, wherein the instructions are further configured to present the augmented reality display that includes one or more activable links, each activable link configured to, upon user activation, perform an action associated with a misplaced card.

\* \* \* \* \*